(12) United States Patent
Ukuda (10) Patent No.: US 6,932,482 B2
(45) Date of Patent: Aug. 23, 2005

(54) FOG PREVENTION AND ANTIREFLECTION OPTICAL ELEMENT AND OPTICAL EQUIPMENT INCORPORATING THE SAME

(75) Inventor: Hideo Ukuda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 122 days.

(21) Appl. No.: 10/215,914

(22) Filed: Aug. 12, 2002

(65) Prior Publication Data

US 2003/0030909 A1 Feb. 13, 2003

(30) Foreign Application Priority Data

Aug. 10, 2001 (JP) ........................ 2001-243334
Jul. 31, 2002 (JP) ........................ 2002-223127

(51) Int. Cl.[7] ............................................... G02B 7/00
(52) U.S. Cl. ........................................ 359/507; 523/169
(58) Field of Search ............................ 359/507, 582; 523/169

(56) References Cited

U.S. PATENT DOCUMENTS

| | | | | |
|---|---|---|---|---|
| 4,409,285 A | * | 10/1983 | Swerdlow | 428/332 |
| 5,134,021 A | * | 7/1992 | Hosono et al. | 428/213 |
| 5,976,680 A | * | 11/1999 | Ikemori et al. | 428/212 |
| 6,055,376 A | | 4/2000 | Ohtaka et al. | 396/51 |
| 6,287,683 B1 | * | 9/2001 | Itoh et al. | 428/336 |
| 6,352,758 B1 | * | 3/2002 | Huang et al. | 428/143 |
| 6,394,613 B1 | | 5/2002 | Hatakeyama et al. | 359/507 |
| 6,420,020 B1 | * | 7/2002 | Yamazaki et al. | 428/336 |
| 2003/0030907 A1 | * | 2/2003 | Ukuda | 359/507 |

FOREIGN PATENT DOCUMENTS

| | | | |
|---|---|---|---|
| JP | 11-109105 | 4/1999 | |
| JP | 2001074902 A | * 3/2001 | ............ G02B/1/10 |

OTHER PUBLICATIONS

Heavens, O.S., Ph.D, "Optical Properties of Thin Solid Films" (New York, Dover Publications, 1991), p. 217.*

* cited by examiner

Primary Examiner—Mark A. Robinson
Assistant Examiner—Alessandro Amari
(74) Attorney, Agent, or Firm—Fitzpatrick, Cella, Harper & Scinto (57) ABSTRACT

In a fog prevention and antireflection optical element including a first water absorption layer containing a water-absorbing polymer as its main component, a high refractive layer, and a second water absorption layer which are formed on a base in this order, an inorganic material (nd>1.70) is mixed in the water-absorbing polymer of the first water absorption layer, whereby the difference in refractive index with respect to the optical element is decreased.

17 Claims, 7 Drawing Sheets

FILM COMPOSITION, FOG PREVENTION CHARACTERISTIC AND REFLECTION CHARACTERISTIC OF OPTICAL ELEMENT

| | COMPOSITION FIGURE (ELLIPSOMETRY ANALYSIS) | INORGANIC PARTICLE | RATE OF INORGANIC PARTICLE | DIFFERENCE IN REFRACTIVE INDEX WITH RESPECT TO A BASE | REFLECTANCE INTENSITY WIDTH IN THE VICINITY OF 600nm DEFECT OF INTERFERENCE FRINGE | ANTIREFLECTION CHARACTERISTIC (REFLECTANCE OF ONE SIDE) |
|---|---|---|---|---|---|---|
| EXAMPLE 1 | THIN WATER ABSORPTION LAYER (110nm) / TiO₂ LAYER / WATER ABSORPTION LAYER (ABOUT 4μm) TiO₂ 13% / BASE (PBM2) | TiO₂ | 13w% | 0.07 | 0.006 △ | 0.033 |
| COMPARATIVE EXAMPLE 1 | THIN WATER ABSORPTION LAYER (135nm) / TiO₂ LAYER / WATER ABSORPTION LAYER (ABOUT 4μm) TiO₂ 0% / BASE (PBM2) | ----- | ----- | 0.10 | 0.012 × | 0.035 |
| EXAMPLE 2 | THIN WATER ABSORPTION LAYER (105nm) / TiO₂ LAYER / WATER ABSORPTION LAYER (ABOUT 4μm) TiO₂ 23% / BASE (PBM2) | TiO₂ | 23w% | 0.03 | 0.003 ○ | 0.030 |
| COMPARATIVE EXAMPLE 2 | THIN WATER ABSORPTION LAYER (135nm) / TiO₂ LAYER / WATER ABSORPTION LAYER (ABOUT 4μm) SiO₂ 23% / BASE (PBM2) | SiO₂ | 23w% | 0.10 | 0.012 × | 0.035 |
| EXAMPLE 3 | THIN WATER ABSORPTION LAYER (100nm) / TiO₂ LAYER / WATER ABSORPTION LAYER (ABOUT 4μm) TiO₂ 37% / BASE (PBM2) | TiO₂ | 37w% | 0.012 | 0.001 ◎ | 0.027 |

FIG. 1

| FIG. 1A |
|---|
| FIG. 1B |

FIG. 1A

FILM COMPOSITION, FOG PREVENTION CHARACTERISTIC AND REFLECTION CHARACTERISTIC OF OPTICAL ELEMENT

| | COMPOSITION FIGURE (ELLIPSOMETRY ANALYSIS) | INORGANIC PARTICLE | RATE OF INORGANIC PARTICLE | DIFFERENCE IN REFRACTIVE INDEX WITH RESPECT TO A BASE | REFLECTANCE INTENSITY WIDTH IN THE VICINITY OF 600nm DEFECT OF INTERFERENCE FRINGE | ANTIREFLECTION CHARACTERISTIC (REFLECTANCE OF ONE SIDE) |
|---|---|---|---|---|---|---|
| EXAMPLE 1 | THIN WATER ABSORPTION LAYER (110nm) / TiO2 LAYER / WATER ABSORPTION LAYER (ABOUT 4μm) TiO2 13% / BASE (PBM2) | TiO2 | 13w% | 0.07 | 0.006 △ | 0.033 |
| COMPARATIVE EXAMPLE 1 | THIN WATER ABSORPTION LAYER (135nm) / TiO2 LAYER / WATER ABSORPTION LAYER (ABOUT 4μm) TiO2 0% / BASE (PBM2) | ---- | ---- | 0.10 | 0.012 × | 0.035 |

FROM FIG. 1A

| | | | | | | |
|---|---|---|---|---|---|---|
| EXAMPLE 2 | THIN WATER ABSORPTION LAYER (105nm)<br>TiO2 LAYER<br>WATER ABSORPTION LAYER (ABOUT 4μm) TiO2 23%<br>BASE (PBM2) | TiO2 | 23w% | 0.03 | 0.003 ○ | 0.030 |
| COMPARATIVE EXAMPLE 2 | THIN WATER ABSORPTION LAYER (135nm)<br>TiO2 LAYER<br>WATER ABSORPTION LAYER (ABOUT 4μm) SiO2 23%<br>BASE (PBM2) | SiO2 | 23w% | 0.10 | 0.012 × | 0.035 |
| EXAMPLE 3 | THIN WATER ABSORPTION LAYER (100nm)<br>TiO2 LAYER<br>WATER ABSORPTION LAYER (ABOUT 4μm) TiO2 37%<br>BASE (PBM2) | TiO2 | 37w% | 0.012 | 0.001 ◎ | 0.027 |

FIG. 3

GRAPH 2 REFLECTANCE OF EXAMPLE 2 AND EXAMPLE 1

FIG. 6

FOG PREVENTION AND ANTIREFLECTION OPTICAL ELEMENT AND OPTICAL EQUIPMENT INCORPORATING THE SAME

BACKGROUND OF THE INVENTION

1. Field of the Invention

The present invention relates to an optical element having fog prevention and antireflection characteristic. In particular, the present invention relates to an optical element such as a photographic lens, a projection lens, a filter, and a mirror which is excellent in fog prevention, antireflection, and weather resistance, or optical equipment such as electrophotographic equipment incorporating such an optical element.

2. Related Background Art

Conventionally, for preventing fog of a lens, a filter, a mirror, and the like, a method of coating a surface with a surfactant is generally conducted. Recently, it is also known that fog is prevented by coating a base such as a lens, a filter, a mirror, or the like with a water-absorbing material instead of a surfactant. Furthermore, conventionally, as a water-absorbing material, known as natural polymers are: starch-based polymers such as a starch-acrylonitrile graft polymer hydrolysate; and cellulose-based polymers such as cellulose-acrylonitrile graft polymer. Known as synthetic polymers are: polyvinyl alcohol-based polymers such as a polyvinyl alcohol cross-linked polymer; acrylic polymers such as a sodium polyacrylate cross-linked substance; and polyether-based polymers such as a polyethylene glycol/diacrylate cross-linked polymer, etc.

However, the above-mentioned conventional fog prevention optical elements have the following problems. First, in the case where a surfactant is used for preventing fog, duration of its effect is very short, and unless the surfactant is applied again within several hours or days, its effect cannot be maintained. Furthermore, in the case where dirt on the surface of an optical element is wiped off with water or the like, a surfactant film is removed, and its effect is lost.

Furthermore, in the case where various water-absorbing materials are applied to form a fog prevention film for preventing fog, the duration of its effect is remarkably enhanced as compared with the case of using a surfactant. However, according to the study by the inventors of the present invention, the following was found: in the case where the water-absorbing material is used for a fog prevention film, when a low refractive material layer is coated onto the fog prevention film so as to obtain an antireflection effect, the fog prevention characteristic tends to be lost. Furthermore, in the case where the water absorption layer is made thin, and the thickness of an optical film is adjusted to an odd multiple of one-quarter of the wavelength of antireflection target to obtain an antireflection film, the thickness of the water-absorbing film becomes too thin, and sufficient fog prevention characteristic cannot be obtained.

In order to solve the above-mentioned problems, the inventors of the present invention have proposed, in Japanese Patent Application Laid-Open No. 11-109105, of forming films with different refractive indexes on a water-absorbing film to obtain an antireflection film. However, in this composition, there is no problem in the case where a lens and a filter with a refractive index nd of about 1.50 are used; however, in the case where a glass base having a high refractive index (nd>1.60) is used, interference fringes become conspicuous between the water absorption film and the base due to even a slight difference in thickness, so that a defect is observed regarding its outer appearance.

SUMMARY OF THE INVENTION

Therefore, with the foregoing in mind, it is an object of the present invention to provide an optical element having both a fog prevention effect and antireflection characteristic even in the case where a high refractive glass lens/filter is used, or to provide optical equipment in which moisture condensation or the like do not occur when incorporating the optical element therein.

In order to achieve the above-mentioned object, an optical element of the present invention includes an optical component, and a first water absorption layer containing a water-absorbing polymer formed which is formed on the optical component, characterized in that an inorganic material with a refractive index higher than that of the water-absorbing polymer of the first water absorption layer is mixed in the water-absorbing polymer.

Herein, the inorganic material is preferably inorganic particles. It is also preferable that the inorganic particles are $TiO_2$ particles. Furthermore, the inorganic particles are preferably mixed in the first water absorption layer as they are, and more preferably mixed therein as particles having a diameter of 5 nm to 20 nm. The rate of the inorganic material to be mixed in the first water absorption layer is preferably 10 to 40 w %. Furthermore, the refractive index nd of the inorganic material is preferably larger than 1.70.

Furthermore, it is more preferable that a thickness of the first water absorption layer is 1 μm to 20 μm.

Furthermore, it is preferable that a high refractive layer is formed on the first water absorption layer, and a second water absorption layer containing a water-absorbing polymer is formed on the high refractive layer. It is preferable that the second water absorption layer contains the inorganic material. Herein, it is preferable that a thickness of the second water absorption layer is less than 1 μm, and a thickness of the second water absorption layer is less than 200 nm. Herein, it may be possible to stack a plurality of antireflection layers each consisting of the high refractive layer and the second water absorption layer that are integrally formed, to constitute an optical element.

Furthermore, a difference in refractive index between the first water absorption layer and the optical element is preferably 0.05 or less, more preferably 0.02 or less.

Furthermore, it is preferable that the element has antireflection characteristics.

Furthermore, optical equipment of the present invention preferably includes the above-mentioned optical element. Furthermore, when the optical element is exposed to the outside, the effect of the present invention is enhanced. Furthermore, the optical equipment may be an image pickup apparatus that includes an image pickup optical system and a finder optical system, wherein the finder optical system includes the optical element. Furthermore, the optical element may be an eyepiece of the finder optical system.

These and other advantages of the present invention will become apparent to those skilled in the art upon reading and understanding the following detailed description with reference to the accompanying figures.

BRIEF DESCRIPTION OF THE DRAWINGS

FIG. 1, which is comprised of FIGS. 1A and 1B, is a table summarizing film compositions, fog prevention characteristics, reflection characteristics, and the like of fog prevention and antireflection optical elements in Examples 1 to 3 and Comparative Examples 1 and 2.

DETAILED DESCRIPTION OF THE PREFERRED EMBODIMENTS

In the embodiments of the present invention, the above-mentioned composition is applied. That is, inorganic particles with a refractive index (preferably nd>1.70) higher than that of a base material are mixed in a water-absorbing polymer that is a material for a first water absorption layer to be formed on a base (substrate) side of an optical element, so as to decrease the difference in refractive index with respect to the base of the optical element, whereby the object of the present invention can be achieved. More specifically, by using a material containing a mixture of the water-absorbing polymer of the first water absorption layer and the inorganic particles with a high refractive index, the difference in refractive index between the base of the optical element and the first water absorption layer can be decreased, whereby interference fringes caused by the difference in refractive index between the base of the optical element and the water absorption layer (water absorption film) can be suppressed. In this case, if the refractive index of the inorganic particles is 1.70 or more, and the difference in refractive index between the base of the optical element and the first water absorption layer is 0.02 or less, even in the case where a high refractive lens and filter with a refractive index of 1.60 or more is used, interference fringes occurring in the optical element due to the non-uniform thickness of the first water absorption layer are not observed.

Thus, it is possible to provide an optical element having both a fog prevention effect and antireflection characteristic which employs a high refractive glass, and optical equipment in which moisture condensation and the like do not occur when incorporating the optical element therein.

Herein, the inorganic particles are present in the film as they are, that is, in the form of particles. It is preferable that the inorganic particles are present so as to have a diameter of about 3 nm to 30 nm or 5 nm to 20 nm.

In the above-mentioned composition of the present invention, as the water-absorbing polymer to be a material for the water absorption film, conventionally known various polymers shown below can be used. That is, as natural polymer derivatives, there are: starch-based polymers such as a starch-acrylonitrile graft polymer hydrolysate; and cellulose-based polymers such as cellulose-acrylonitrile graft polymer. Examples of synthetic polymers include: polyvinyl alcohol based polymers such as a polyvinyl alcohol cross-linked polymer; acrylic polymers such as a sodium polyacrylate cross-linked substance; and polyether-based polymers such as a polyethylene glycol/diacrylate cross-linked polymer. Among them, highly water-absorptive materials such as polyacrylic acids, polyvinyl alcohols, and the like are preferably used.

Examples of the polyacrylic acids used herein include polyacrylic acid, polymethacrylic acid, polyacrylamide, and salts thereof (potassium polyacrylate, sodium polyacrylate, etc.). Preferably, polyacrylic acid and polymethacrylic acid are used. It is desirable that inorganic particles (nd>1.7) are mixed in the material for the water absorption film so as to set the difference in refractive index with respect to the base to be ±0.05 or less (this allows interference fringes to be hardly recognizable).

Furthermore, it is desirable that inorganic particles having a refractive index nd greater than 1.7 are mixed in the material for the water absorption film so as to set the difference in refractive index with respect to the base to be 0.02 or less (this allows to achieve the effect that is substantially the same as that attained by using a glass base (nd=1.52) in Japanese Patent Application Laid-Open No. 11-109105). Herein, $TiO_2$ particles with a high refractive index (nd=2.3; diameter: 10 nm), which are generally obtained easily, were used. Needless to say, other inorganic particles may be used.

Herein, it is preferable that the thickness of the first water absorption film is set to be 1 μm or more so as to increase the amount of its water absorption and enhance fog prevention characteristic. Furthermore, a thickness of 20 μm or less is preferable so as to prevent the water absorption film from excessively expanding due to excessive water absorption. The thickness is more preferably set to be 2 μm to 8 μm.

Furthermore, the high refractive layer is obtained by soaking a base including a water absorption film in a solution containing metal alkoxide as a main component of a dissolved substance, and pulling up the base to coat the base with the solution, followed by sintering.

Examples of the metal alkoxide include compounds represented by the following formulae (1) and (2):

$$M(OR)a \qquad (1),$$

and $$M(OR)n(X)a-n \qquad (2)$$

where "M" is an atom selected from the group consisting of Si, Al, Ti, Zr, Ca, Fe, V, Sn, Li, Be, B, and P; "R" is an alkyl group, which is an alkyl group, an alkyl group having a functional group, or halogen; "a" is a valence of "M"; and "n" is an integer of 1 to "a".

In the above, an alkyl group containing a carbonyl, carboxyl, amino, vinyl, or epoxy group is preferable as "X".

Examples of particularly preferable inorganic alkoxide include $Si(OC_2H_5)_4$, $Al(O—iso—C_3H_7)_3$, $Ti(O—iso—C_3H_7)_4$, $Zr(O—t—C_4H_9)_4$, $Zr(O—n—C_4H_9)_4$, $Ca(OC_2H_5)_2$, $Fe(OC_2H_5)_3$, $V(O—iso—C_3H_7)_4$, $Sn(O—t—C_4H_9)_4$, $Li(OC_2H_5)$, $Be(OC_2H_5)_2$, $B(OC_2H_5)_3$, $P(OC_2H_5)_2$, and $P(OCH_3)_3$. In order to decrease the reflectance of the fog prevention and antireflection optical element, the refractive index of the high refractive thin film is preferably 1.68 or more. For this purpose, in particular, $Al(O—iso—C_3H_7)_3$, $Ti(O—iso—C_3H_7)_4$, $Zr(O—t—C_4H_9)_4$, $Zr(O—n—C_4H_9)_4$, and $Sn(O—t—C_4H_9)_4$ are preferable.

The fog prevention and antireflection optical element produced by using such a procedure has fog prevention characteristic and has no defect regarding its outer appearance that would be caused due to its antireflection characteristic and interference.

Furthermore, the fog prevention and antireflection optical element of the present invention has fog prevention characteristic and excellent light transmittance, and is applicable to optical elements using lenses with various refractive indexes in which fog occurs due to condensation of moisture.

EXAMPLES

Hereinafter, the present invention will be described based on Examples below.

Example 1

In Example 1, 10 parts by weight of polyvinyl alcohol (number-average polymerization: 2000; saponification: 88 mol %) was dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 96 parts by weight of methanol were added. The resultant mixture was stirred at room temperature for 30 minutes, thereby preparing a fog prevention coating solution. Then, 7.5 parts by weight of a methanol solution containing 20 W % of $TiO_2$ particles (nd=2.3; diameter: 10 nm) was mixed in the fog prevention coating solution, and the rate of the inorganic particles with respect to the concentration of a total solid content was set to be 13 w %.

The solution thus obtained was applied to a filter (substrate) of high refractive glass (PBM2: nd=1.62, produced by Ohara Inc.) having a thickness of 1 mm by dip coating, then was dried and cured at 150° C. for 15 minutes, whereby an absorption layer (thickness: 4 $\mu$m) was formed on both surfaces of the filter.

Thereafter, a solution, in which 0.50 g of 2-normal HCl and 0.25 g of water were dissolved in 10 g of i-propanol, was mixed in 100 g of isobutyl acetate. The resultant solution was added to a solution in which 7.5 g of titanium tetraisopropoxide (Ti(O—iso—Pr)$_4$Pr:C$_3$H$_7$) was dissolved in 130 g of isobutyl acetate. The solution thus obtained was stirred at room temperature for 24 hours to set a hydrolysis ratio to be 0.75 to obtain a high refractive layer forming solution. The above-mentioned water absorption layer was soaked in the high refractive layer forming solution, pulled up by dip coating at 30 mm/min so as to coat the water absorption layer with the high refractive layer forming solution, and sintered at 150° C. for 5 minutes, whereby a high refractive layer was formed.

A layer (top layer) to be formed on the high refractive layer was obtained as follows: the fog prevention coating solution was diluted with a mixture containing methanol and water at a ratio of 1:1 to obtain a solution having its viscosity adjusted to 14 cp; the solution thus obtained was applied to the high refractive layer by dip coating, sintered at 150° C. for 15 minutes, thereby adjusting the film thickness to 110 nm. Thus, preparation of the fog prevention film was completed.

The fog prevention characteristics of an optical element having the fog prevention film thus formed were evaluated by a method (Evaluation method 1) in which the breath is applied over the optical element in an atmosphere of room temperature (temperature: 30° C., humidity: 80%) to examine whether fogging occurs and a method (Evaluation method 2) in which the optical element is transferred from a place at 2.5° C. to a place at room temperature (temperature 30° C.; humidity 80%) to observe whether fogging occurs.

As a result, the optical element produced in Example 1 was "not changed" in both Evaluation methods 1 and 2.

Figures 1, 1A:
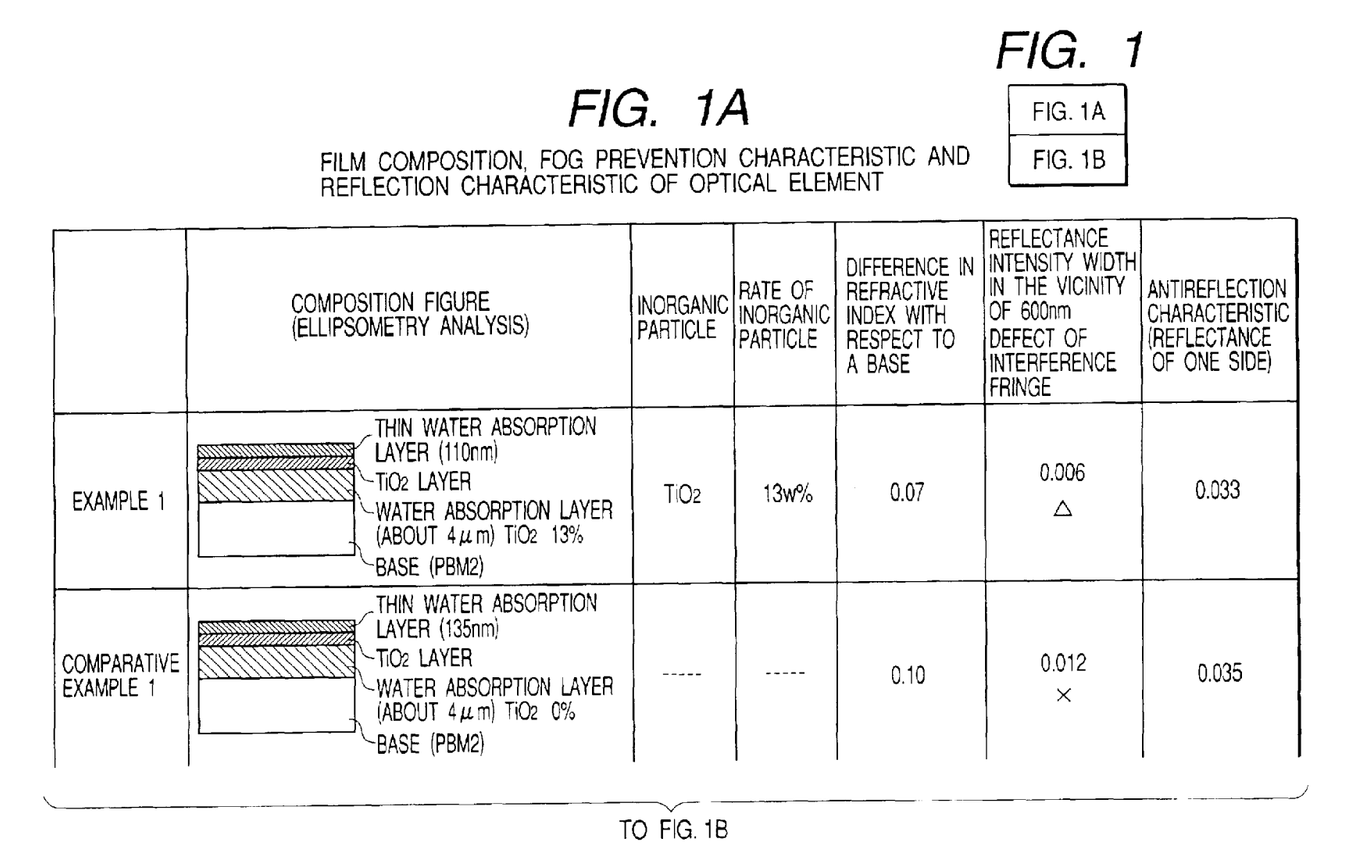

Next, only the first water absorption layer was formed on an S-BSL7 base (produced by Ohara Inc.), and the refractive index thereof was measured by spectroellipsometer (WVASE: J. A. Woollam Co., Inc). The refractive index nd was 1.56, and the difference in refractive index with respect to the base was 0.07 (FIG. 1A).

Figure 2:
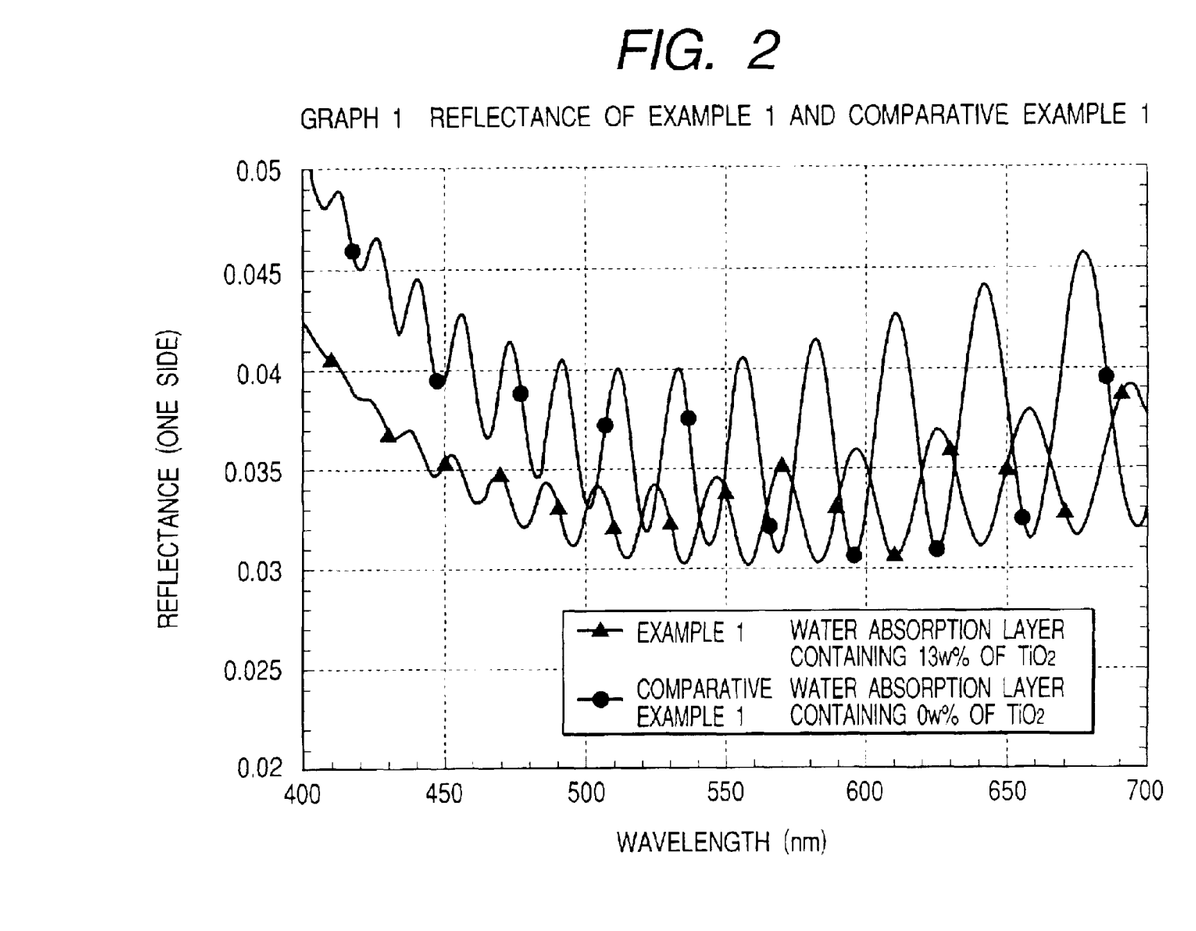
FIG. 2 is a graph showing the comparison of reflectance between Example 1 and Comparative Example 1.

The reflectance was measured by a spectrometer (U4000, produced by Hitachi Ltd.). FIG. 2 (Graph 1) shows the measured values. Regarding the antireflection performance, the reflectance becomes about 0.033 with respect to light in the vicinity of a wavelength of 500 nm at which the reflectance becomes lowest (FIG. 1A). When the reflectance characteristics in the vicinity of 600 nm were measured, the amplitude characteristics thereof was about 0.006, which indicates that interference fringes of the entire optical filter become smaller as compared with Comparative Example 1 described later (FIG. 1A). It is also understood that, compared with Comparative Example 1, the reflectance is low (i.e. antireflection characteristics are better).

Comparative Example 1

In Comparative Example 1, 10 parts by weight of polyvinyl alcohol (number-average polymerization: 2000; saponification: 88 mol %) was dissolved by heating in 100 parts by weight of water to prepare a solution. To this solution, a solution in which 0.5 parts by weight of hexmethoxymethylol melamine, 0.05 parts by weight of ammonium paratoluenesulfonate, and 0.3 parts by weight of 2,2',4,4'-tetrahydroxybenzophenone were dissolved in 100 parts by weight of methanol were added. The resultant mixture was stirred at room temperature for 30 minutes, thereby preparing a fog prevention coating solution. Unlike in Example 1, $TiO_2$ particles were not mixed.

The solution thus obtained was applied to a filter of high refractive glass (PBM2: nd=1.62, produced by Ohara Inc.) with a thickness of 1 mm by dip coating, and then dried and cured at 150° C. for 15 minutes, whereby an absorption layer (thickness: 4 $\mu$m) was formed on both surfaces of the high refractive glass.

Thereafter, a solution, in which 0.50 g of 2-normal HCl and 0.25 g of water were dissolved in 10 g of i-propanol, was mixed in 100 g of isobutyl acetate. The resultant solution was added to a solution in which 7.5 g of titanium tetraisopropoxide (Ti(O—iso—Pr)$_4$Pr:C$_3$H$_7$) was dissolved in 130 g of isobutyl acetate. The solution thus obtained was stirred at room temperature for 24 hours to set a hydrolysis ratio to be 0.75 to obtain a high refractive layer forming solution. The above-mentioned water absorption layer was soaked in the high refractive layer forming solution, pulled up by dip coating at 30 mm/min so as to coat the water absorption layer with the high refractive layer forming solution, and sintered at 150° C. for 5 minutes, whereby a high refractive layer was formed.

A top layer was obtained as follows: the fog prevention coating solution was diluted with a mixture containing methanol and water at a ratio of 1:1 to obtain a solution having its viscosity adjusted to 14 cp; the solution thus obtained was applied to the high refractive layer by dip coating, sintered at 150° C. for 15 minutes, thereby adjusting the film thickness to 110 nm.

The fog prevention characteristics of the optical element thus formed were evaluated by the above-mentioned Evaluation methods 1 and 2. As a result, the optical element prepared in Comparative Example 1 was "not changed" in both Evaluation methods 1 and 2.

Next, only the first water absorption layer was formed on an S-BSL7 base (produced by Ohara Inc.), and the refractive index thereof was measured by spectroellipsometer (WVASE: J. A. Woollam Co., Inc). The refractive index nd was 1.514, and the difference in refractive index with respect to the base was 0.10 (FIG. 1A).

The reflectance was measured by a spectrometer (U4000, produced by Hitachi Ltd.). FIG. 2 (Graph 1) shows the measured values. Regarding the antireflection performance, the reflectance became about 0.033 with respect to light in the vicinity of a wavelength of 500 nm at which the reflectance became lowest (FIG. 1A). When the reflectance characteristics in the vicinity of 600 nm were measured, the amplitude characteristics thereof became about 0.012, and a defect caused by interference fringes formed over the entire optical filter (particularly, in the peripheral portion thereof) was conspicuous (FIG. 1A).

Example 2

In Example 2, 10 parts by weight of polyvinyl alcohol (number-average polymerization: 2000; saponification: 88 mol %) was dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 87 parts by weight of methanol were added. The resultant mixture was stirred at room temperature for 30 minutes, thereby preparing a fog prevention coating solution. Then, unlike in Example 1, 15.8 parts by weight of a methanol solution containing 20 W % of $TiO_2$ particles (nd=2.3; diameter: 10 nm) was mixed in the fog prevention coating solution, and the rate of the inorganic particles with respect to the concentration of a total solid content was set to be 23 w %.

The solution thus obtained was applied to a filter of high refractive glass (PBM2: nd=1.62, produced by Ohara Inc.) with a thickness of 1 mm by dip coating, dried, and cured at 150° C. for 15 minutes, whereby an absorption layer (thickness: 4 μm) was formed on both surfaces of the high refractive glass.

Thereafter, a solution, in which 0.50 g of 2-normal HCl (2 mol/l Hydrochloric Acid) and 0.25 g of water were dissolved in 10 g of i-propanol, was mixed in 100 g of isobutyl acetate. The resultant solution was added to a solution in which 7.5 g of titanium tetraisopropoxide $(Ti(O\text{-iso-}Pr)_4Pr:C_3H_7)$ was dissolved in 130 g of isobutyl acetate. The solution thus obtained was stirred at room temperature for 24 hours to set a hydrolysis ratio to be 0.75 to obtain a high refractive layer forming solution. The above-mentioned water absorption layer was soaked in the high refractive layer forming solution, pulled up by dip coating at 30 mm/min so as to coat the water absorption layer with the high refractive layer forming solution, and sintered at 150° C. for 5 minutes, whereby a high refractive layer was formed.

An upper layer (top layer) to be formed on the high refractive layer was obtained as follows: The fog prevention coating solution was diluted with a mixture containing methanol and water at a ratio of 1:1 so that the viscosity became 14 cp to thereby obtain a solution; the solution thus obtained was applied to the high refractive layer by dip coating, sintered at 150° C. for 15 minutes, thereby adjusting the film thickness to 105 nm.

The fog prevention characteristics of an optical element thus formed were evaluated by the above-mentioned Evaluation methods 1 and 2. As a result, the optical element created in Comparative Example 1 was "not changed" in both Evaluation methods 1 and 2.

Figure 1B:
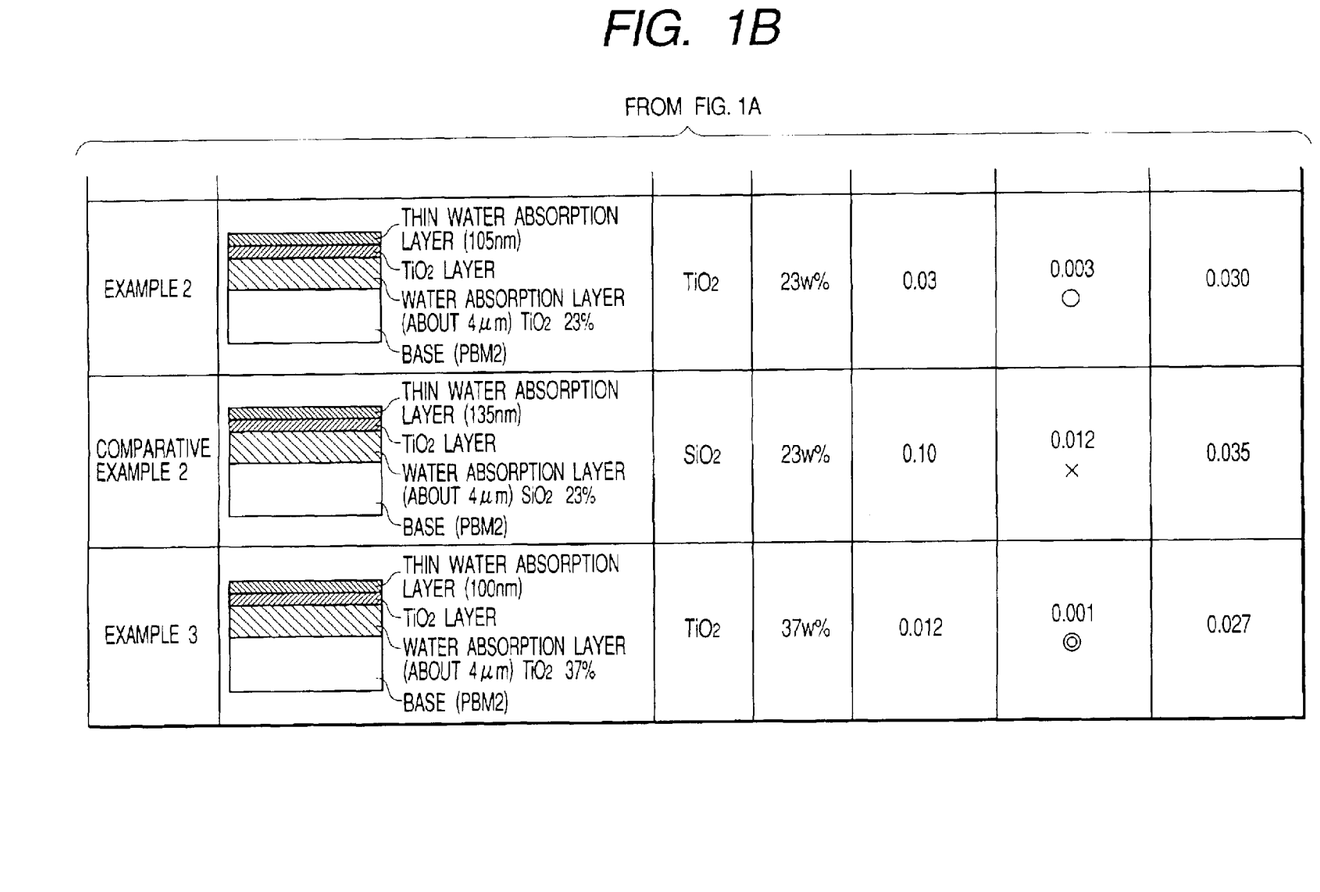

Next, only the first water absorption layer was formed on an S-BSL7 base (produced by Ohara Inc.), and the refractive index thereof was measured by spectroellipsometer (WVASE: J. A. Woollam Co., Inc). The refractive index nd was 1.59, and the difference in refractive index with respect to the base was 0.03 (FIG. 1B).

Figure 3:
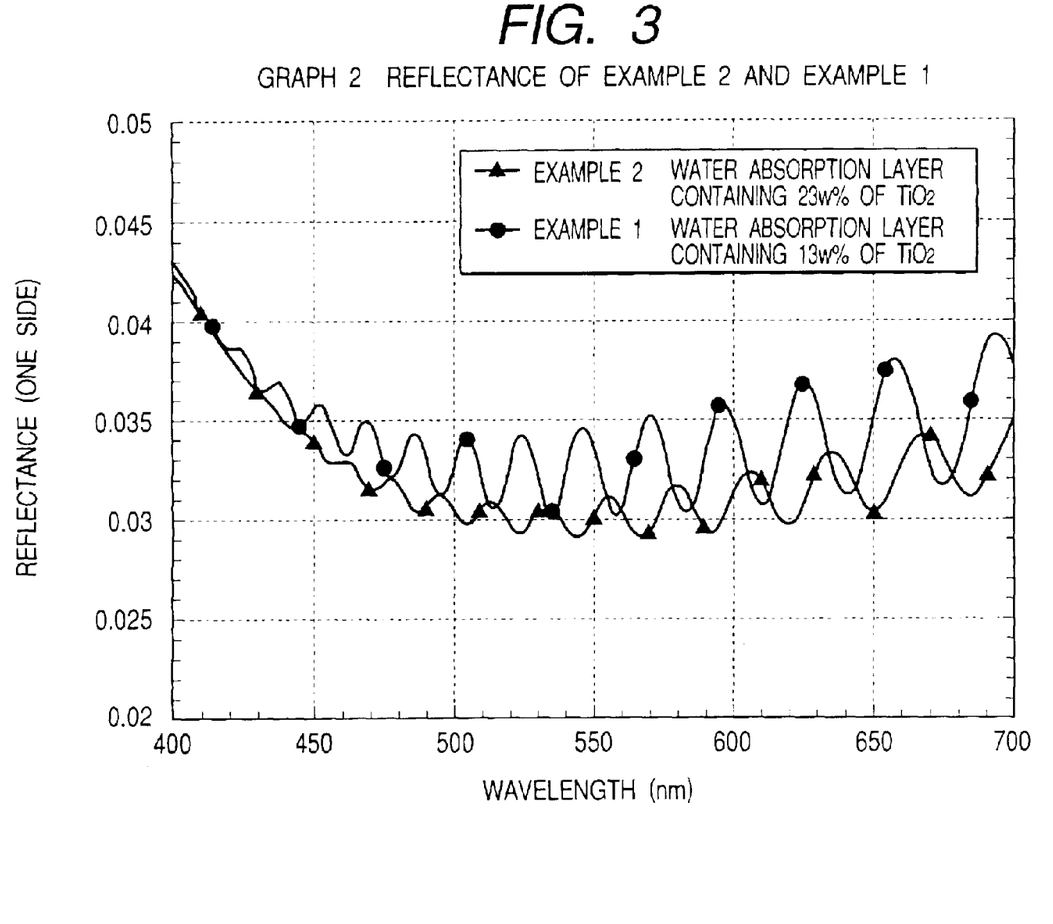
FIG. 3 is a graph showing the comparison of reflectance between Example 2 and Example 1.

The reflectance was measured by a spectrometer (U4000, produced by Hitachi Ltd.). FIG. 3 (Graph 2) shows the measured values. Regarding the antireflection performance, the reflectance became about 0.030 with respect to light in the vicinity of a wavelength of 500 nm at which the reflectance became lowest (FIG. 1B). When the reflectance characteristics in the vicinity of 600 nm were measured, the amplitude characteristics thereof indicated a substantially smaller value of 0.003, and interference fringes were almost unnoticeable (FIG. 1B).

Comparative Example 2

In Comparative Example 2, 10 parts by weight of polyvinyl alcohol (number-average polymerization: 2000; saponification: 88 mol %) were dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 87 parts by weight of methanol were added. The resultant mixture was stirred at room temperature for 30 minutes, thereby preparing a fog prevention coating solution. Then, unlike in Example 2, 15.8 parts by weight of a methanol solution containing 20 W % of $SiO_2$ particles (nd=1.45; diameter: 10 nm) was mixed in the fog prevention coating solution, and the rate of the inorganic particles with respect to the concentration of a total solid content was set to be 23 w %.

The solution thus obtained was applied to a filter of high refractive glass (PBM2: nd=1.62, produced by Ohara Inc.) with a thickness of 1 mm by dip coating, and then was dried and cured at 150° C. for 15 minutes, whereby an absorption layer (thickness: 4 μm) was formed on both surfaces of the high refractive glass.

Thereafter, a solution, in which 0.50 g of 2-normal HCl and 0.25 g of water were dissolved in 10 g of i-propanol, was mixed in 100 g of isobutyl acetate. The resultant solution was added to a solution in which 7.5 g of titanium tetraisopropoxide $(Ti(O\text{—iso—}Pr)_4Pr:C_3H_7)$ was dissolved in 130 g of isobutyl acetate. The solution thus obtained was stirred at room temperature for 24 hours to set a hydrolysis ratio to be 0.75 to obtain a high refractive layer forming solution. The above-mentioned water absorption layer was soaked in the high refractive layer forming solution, pulled up by dip coating at 30 mm/min so as to coat the water absorption layer with the high refractive layer forming solution, and sintered at 150° C. for 5 minutes, whereby a high refractive layer was formed.

An upper layer (top layer) to be formed on the high refractive layer was obtained as follows: the fog prevention coating solution was diluted with a mixture containing methanol and water at a ratio of 1:1 so that the viscosity became 14 cp to obtain a solution; the solution thus obtained was applied to the high refractive layer by dip coating, sintered at 150° C. for 15 minutes, thereby adjusting the film thickness to 105 nm.

The fog prevention characteristics of an optical element thus formed were evaluated by the above-mentioned Evaluation methods 1 and 2. As a result, the optical element created in Comparative Example 1 was "not changed" using both Evaluation methods 1 and 2.

Next, only the first water absorption layer was formed on an S-BSL7 base (produced by Ohara Inc.), and the refractive index thereof was measured by spectroellipsometer (WVASE: J. A. Woollam Co., Inc). The refractive index nd was 1.510, and the difference in refractive index with respect to the base was 0.10 (FIG. 1B).

Figure 4:
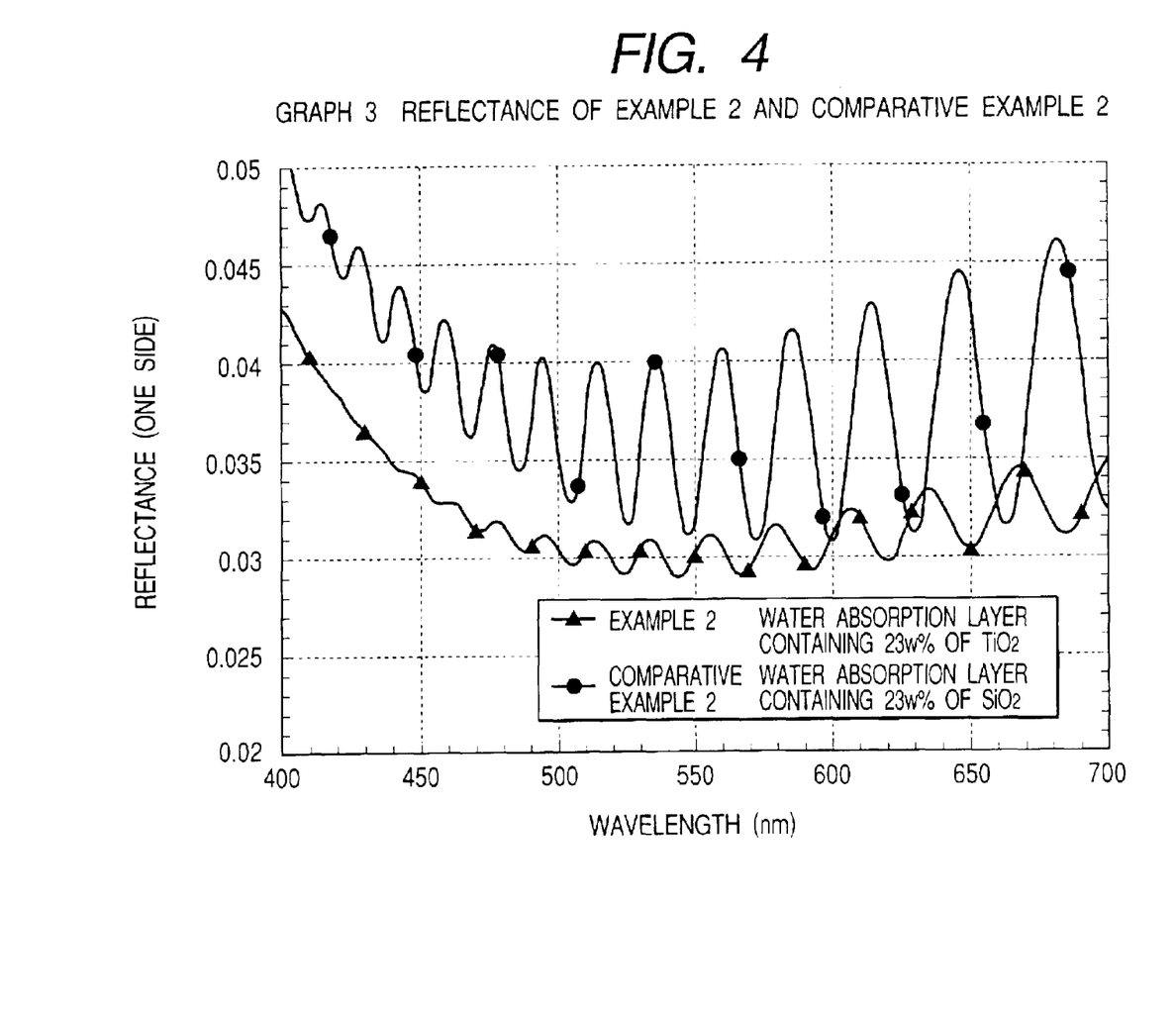
FIG. 4 is a graph showing the comparison of reflectance between Example 2 and Comparative Example 2.

The reflectance was measured by a spectrometer (U4000, produced by Hitachi Ltd.). FIG. 4 (Graph 3) shows the measured values. Regarding the antireflection performance, the reflectance became about 0.035 with respect to light in the vicinity of a wavelength of 500 nm at which the reflectance became lowest (FIG. 1B). When the reflectance characteristics in the vicinity of 600 nm were measured, the amplitude characteristics thereof became about 0.012 (FIG. 1B), and a defect caused by interference fringes of the entire optical filter (particularly, in the peripheral portion) was conspicuous (it is not effective as is like Example 1).

Example 3

In Example 3, 10 parts by weight of polyvinyl alcohol (number-average polymerization: 2000; saponification: 88 mol %) was dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 76.5 parts by weight of methanol were added. The resultant mixture was stirred at room temperature for 30 minutes, thereby preparing a fog prevention coating solution. Then, unlike in Example 1 or 2, 29.4 parts by weight of a methanol solution containing 20 W % of $TiO_2$ particles (nd=2.3; diameter: 10 nm) was mixed in the fog prevention coating solution, and the rate of the inorganic particles with respect to the concentration of a total solid content was set to be 37 w %.

The solution thus obtained was applied to a filter of high refractive glass (PBM2: nd=1.62, produced by Ohara Inc.) with a thickness of 1 mm by dip coating, and then was dried and cured at 150° C. for 15 minutes, whereby an absorption layer (thickness: 4 µm) was formed on both surfaces of the high refractive glass.

Thereafter, a solution, in which 0.50 g of 2-normal HCl and 0.25 g of water were dissolved in 10 g of i-propanol, was mixed in 100 g of isobutyl acetate. The resultant solution was added to a solution in which 7.5 g of titanium tetraisopropoxide $(Ti(O-iso-Pr)_4Pr:C_3H_7)$ was dissolved in 130 g of isobutyl acetate. The solution thus obtained was stirred at room temperature for 24 hours to set a hydrolysis ratio to be 0.75 to obtain a high refractive layer forming solution. The above-mentioned water absorption layer was soaked in the high refractive layer forming solution, pulled up by dip coating at 30 mm/min so as to coat the water absorption layer with the high refractive layer forming solution, and sintered at 150° C. for 5 minutes, whereby a high refractive layer was formed.

An upper layer (top layer) to be formed on the high refractive layer was obtained as follows: The fog prevention coating solution was diluted with a mixture containing methanol and water at a ratio of 1:1 so that the viscosity became 14 cp to obtain a solution; the solution thus obtained was applied to the high refractive layer by dip coating, sintered at 150° C. for 15 minutes, thereby adjusting the thickness to 100 nm.

The fog prevention characteristics of an optical element thus formed were evaluated by the above-mentioned Evaluation methods 1 and 2. As a result, the optical element created in Comparative Example 1 was "not changed" in Evaluation methods 1 and 2.

Next, only the first water absorption layer was formed on an S-BSL7 base (produced by Ohara Inc.), and the refractive index thereof was measured by spectroellipsometer (WVASE: J. A. Woollam Co., Inc) The refractive index nd was 1.633, and the difference in refractive index with respect to the base was 0.012 (FIG. 1B).

Figure 5:
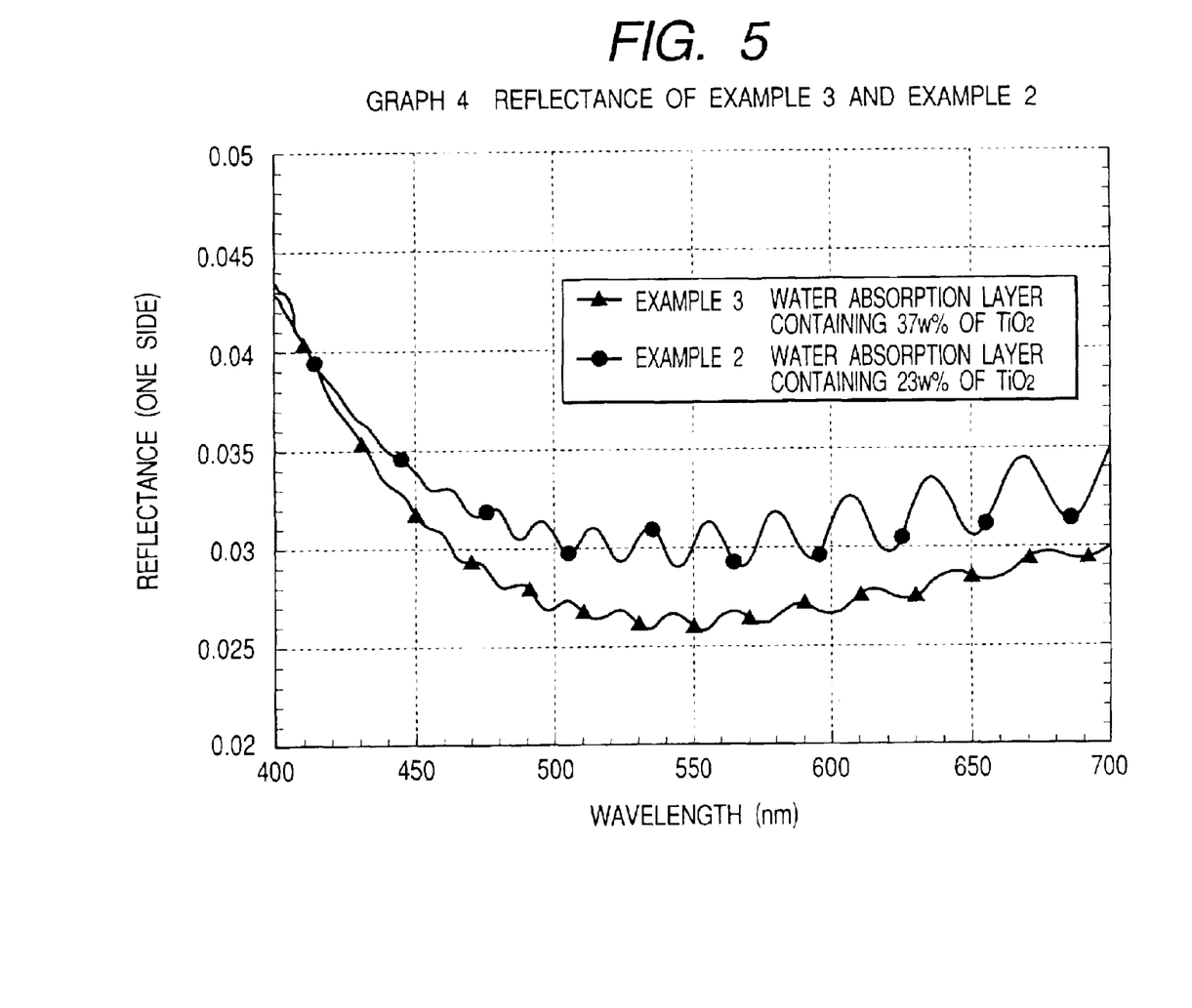
FIG. 5 is a graph showing the comparison of reflectance between Example 3 and Example 2.

The reflectance was measured by a spectrometer (U4000, produced by Hitachi Ltd.). FIG. 5 (Graph 4) shows the measured values. Regarding the antireflection performance, the reflectance becomes about 0.027 with respect to light in the vicinity of a wavelength of 500 nm at which the reflectance becomes lowest (FIG. 1B). When the reflectance characteristics in the vicinity of 600 nm were measured, the amplitude characteristics thereof became about 0.001, and interference fringes were not observed in the entire optical filter (FIG. 1B).

FIGS. 1A and 1B show tables summarizing film compositions, fog prevention characteristics, reflection characteristics, and the like of fog prevention and antireflection optical elements in Examples 1 to 3 and Comparative Examples 1 and 2.

In Examples 1 to 3, $TiO_2$ particles were used as inorganic particles. However, the present invention is not limited thereto. It is preferable that the inorganic particles are contained in the absorption layer in a range of 10 w % (% by weight) to 40 w %.

Furthermore, it is preferable that the film is formed such that the amplitude width of the antireflection characteristics in the vicinity of 600 nm becomes 0.01 or less (1% or less).

Example 4

Figure 6:
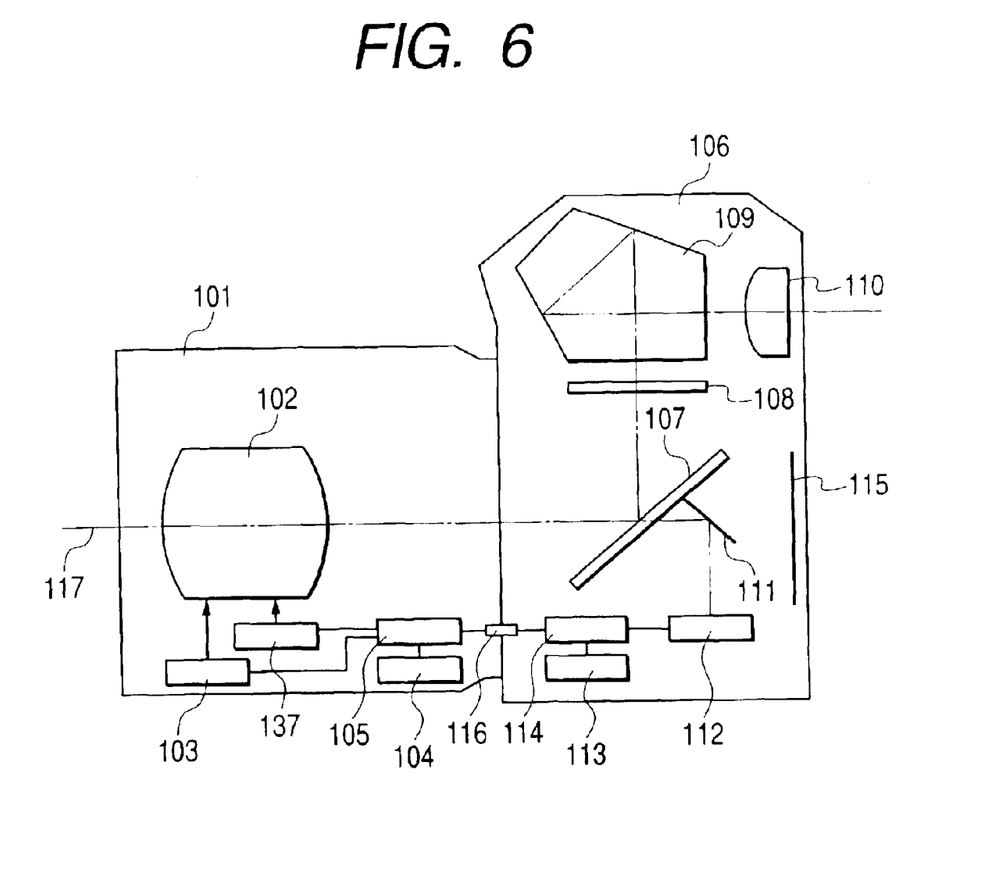
FIG. 6 is a schematic diagram of a camera of Example 4.

FIG. 6 shows a camera (image pickup apparatus) including an optical element with the fog prevention film produced in Example 5. In FIG. 6, reference numeral 101 denotes a lens (zoom lens) body. The lens body includes: an image pickup optical system 102 which has one or a plurality of lens groups inside and is capable of changing a focal length by moving all or a part of the lens groups; a lens state detection unit 137 for detecting the focal length (i.e., zoom state) of the image pickup optical system 102; a driving unit 103 for adjusting a focal state by moving all or a part of the lens groups constituting the image pickup optical system 102; a storage means 104 such as a ROM; and a lens control unit 105 for controlling these components.

The lens state detection unit 137 detects a movement state of a lens that moves to change the focal length (zoom state) of the image pickup optical system 102 and the amount characterizing the movement state, by a known method, for example by using an electrode for an encoder provided in a lens-barrel that is rotated or moved for changing the focal length of the image pickup optical system 102, a detection electrode that is in contact therewith, and the like.

Reference numeral 106 denotes a camera body. The camera body 106 includes a main mirror 107, a focusing glass 108 on which an object image is formed, a pentaprism 109 for inverting an image, and an eyepiece 110, which constitute a finder system. The camera body 106 further includes a sub-mirror 111, a focal point detection unit 112, an operation unit 113, a camera control unit 114, and a film as an image-forming medium placed on an image-forming surface 115. Reference numeral 116 denotes a contact point provided in the lens body 101 and the camera body 106. When the lens body 101 and the cameral body 106 are mounted, various pieces of information are communicated and an electric power is supplied via the contact point 116.

It is preferable that an optical element with a fog prevention film of the present invention is provided in a finder optical system including the image pickup optical system 102, the pentaprism 109, and the eyepiece 110, since fog of the optical element can be prevented. In particular, among lenses (optical components) of the camera, the eyepiece 110 is a lens that is most frequently physically approached by a person. Therefore, the eyepiece 110 conventionally suffered from a problem that it is highly likely to fog. However, by adopting the optical element with the fog prevention film of the present invention for the eyepiece 110, such a problem has been solved.

Like in the above-mentioned camera, regarding a lens, a mirror, and the like that a person frequently approaches physically (i.e., a lens and a mirror exposed to the outside of the apparatus), by preferably applying the fog prevention film of the present example to the surface of the lens and the mirror, that is, by using the optical element of the present example for the lens, mirror, and the like that is frequently approached by a person, a fog prevention effect as well as an antireflection effect can be obtained. Therefore, even if a person approaches the lens, mirror, and the like, the surface of the optical element does not fog, and reflection and/or transmittance with good efficiency can be advantageously obtained.

As described above, it is appreciated that the present invention is applicable to not only an optical element (e.g., a lens, a mirror, a prism, a transparent parallel plate, etc.) provided with the fog prevention film, but also to optical equipment provided with the optical element of the present invention, such as a camera (an image pickup optical system, a finder optical system, etc.), a (liquid crystal) projector (an illumination optical system, a projection optical system, a polarizing plate, a liquid crystal panel substrate, etc.), and other various optical equipment.

As described above, according to the present example, even in the case of using a high refractive glass lens/filter, an optical element having a fog prevention effect as well as antireflection characteristic can be provided, and optical equipment in which moisture condensation or the like does not occur when incorporating the optical element therein can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical element comprising:
   an optical component having a refractive index (nd) greater than 1.60; and
   a first water absorption layer containing a water-absorbing polymer which covers at least one surface of the optical component,
   wherein an inorganic material with a refractive index higher than that of the water-absorbing polymer of the first water absorption layer is mixed in the water-absorbing polymer, and
   wherein the inorganic material is inorganic particles, which are mixed in the first water absorption layer in particulate form.

2. An optical element according to claim 1, wherein the inorganic particles are $TiO_2$ particles.

3. An optical element according to claim 1, wherein the inorganic particles have a diameter of 5 nm to 20 nm.

4. An optical element according to claim 1, wherein a thickness of the first water absorption layer is 1 mm to 20 mm.

5. An optical element according to claim 1, wherein the refractive index nd of the inorganic material is larger than 1.70.

6. An optical element according to claim 1, wherein a difference in refractive index between the first water absorption layer and the optical element is 0.05 or less.

7. An optical element according to claim 1, wherein a difference in refractive index between the first water absorption layer and the optical element is 0.02 or less.

8. An optical element according to claim 1, wherein the element has antireflection characteristics.

9. Optical equipment comprising the optical element as set forth in claim 1.

10. Optical equipment according to claim 9, wherein the optical element is exposed to the outside.

11. Optical equipment according to claim 9, wherein:
    the optical equipment is an image pickup apparatus;
    the image pickup apparatus includes an image pickup optical system and a finder optical system; and
    the finder optical system includes the optical element.

12. Optical equipment according to claim 11, wherein the optical element is an eyepiece of the finder optical system.

13. An optical element comprising:
    an optical component; and
    a first water absorption layer containing a water-absorbing polymer which covers at least one surface of the optical component,
    wherein an inorganic material with a refractive index higher than that of the water-absorbing polymer of the first water absorption layer is mixed in the water-absorbing polymer,
    wherein the inorganic material is inorganic particles, which are mixed in the first water absorption layer in particulate form, and
    wherein the rate of the inorganic material to be mixed in the first water absorption layer is 10 to 40 w %.

14. An optical element comprising:
    an optical component;
    a first water absorption layer containing a water-absorbing polymer which covers at least one surface of the optical component;
    a high refractive layer formed on the first water absorption layer; and
    a second water absorption layer containing a water-absorbing polymer which is formed on the high refractive layer,
    wherein an inorganic material with a refractive index higher than that of the water-absorbing polymer of the first water absorption layer is mixed in the water-absorbing polymer, and
    wherein the inorganic material is inorganic particles, which are mixed in the first water absorption layer in particulate form.

15. An optical element according to claim 14, wherein the second water absorption layer contains the inorganic material.

16. An optical element according to claim 14, wherein a thickness of the second water absorption layer is less than 1 mm.

17. An optical element according to claim 14, wherein a thickness of the second water absorption layer is less than 200 nm.

* * * * *

UNITED STATES PATENT AND TRADEMARK OFFICE
CERTIFICATE OF CORRECTION

PATENT NO. : 6,932,482 B2
DATED : August 23, 2005
INVENTOR(S) : Hideo Ukuda

It is certified that error appears in the above-identified patent and that said Letters Patent is hereby corrected as shown below:

Column 3,
Line 53, "alcohol based" should read -- alcohol-based --.

Column 10,
Line 57, "cameral" should read -- camera --.

Column 11,
Line 62, "1 mm." should read -- 1 $\mu$m.. --; and
Line 63, "mm." should read -- $\mu$m. --.

Column 12,
Line 61, "mm." should read -- $\mu$m. --.

Signed and Sealed this

Twenty-fourth Day of January, 2006

JON W. DUDAS
*Director of the United States Patent and Trademark Office*